United States Patent
Kallay et al.

[11] 3,792,975
[45] Feb. 19, 1974

[54] PROCESS FOR THE PREPARATION OF FAST DYEINGS OR PRINTS OF SYNTHETIC FIBER MATERIALS

[75] Inventors: Maria Kallay, Mammolshain/Taunus; Karl-Heinz Krell, Kronberg/Taunus; Willi Steckelberg, Hofheim/Taunus, all of Germany

[73] Assignee: Farbwerke Hoechst Aktiengesellschaft vormals Meister Lucius & Bruning, Frankfurt, Germany

[22] Filed: Feb. 22, 1973

[21] Appl. No.: 334,835

[30] Foreign Application Priority Data
Feb. 26, 1972 Germany.............................. 2209210

[52] U.S. Cl. ...................... 8/41 A, 8/41 R, 8/41 B, 8/41 C, 8/41 D, 8/71, 8/94, 260/193
[51] Int. Cl. ...................... D06p 3/72, C09b 29/32
[58] Field of Search 8/41 R, 41 A, 41 B, 41 C, 41 D, 8/71, 94; 260/193

[56] References Cited
UNITED STATES PATENTS
3,382,228  5/1968  Ferrari et al. ........................ 260/158
3,252,968  5/1966  Resnick et al. ....................... 260/193

*Primary Examiner*—Donald Levy
*Assistant Examiner*—Bruce H. Hess
*Attorney, Agent, or Firm*—Curtis, Morris & Safford

[57] ABSTRACT
A process for the preparation of fast dyeings or prints on synthetic fibrous materials, which comprises treating the said fibrous materials in an aqueous dispersion or in an organic solvent with dyestuffs of the formula

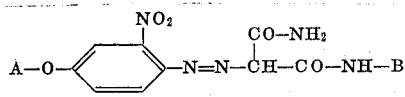

in which A represents alkyl of one to four carbon atoms being unsubstituted or substituted by hydroxyl, lower alkoxy, phenoxy,

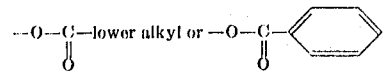

or combinations of two members thereof, and B represents phenyl being unsubstituted or substituted by fluorine, chlorine, bromine, alkyl of one to four carbon atoms, alkoxy of one to four carbon atoms, trifluoromethyl, cyano, nitro, carbo(lower)alkoxy, acetyl, benzoyl or phenyl or combinations of two or three members thereof, or naphthyl, the yellow dyeings or prints so obtained being distinguished by excellent fastness properties, particularly by a good fastness to light and the extraordinary high fastness to thermofixation.

11 Claims, No Drawings

PROCESS FOR THE PREPARATION OF FAST DYEINGS OR PRINTS OF SYNTHETIC FIBER MATERIALS

The present invention relates to a process for the preparation of fast dyeings or prints on synthetic fiber materials, wherein said fiber materials are treated with dye-stuffs of the general formula (1)

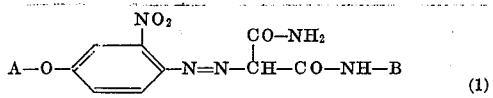
(1)

in which A stands for an alkyl group having one to four carbon atoms, which may be substituted by a hydroxy, alkoxy, phenoxy and/or acyloxy group, and B stands for a naphthyl radical or a phenyl radical which may be substituted by a halogen atom, an alkyl and/or alkoxy group, each having one to four carbon atoms, a trifluoromethyl, cyano, nitro, carbalkoxy, acetyl, benzoyl and/or phenyl group, the alkoxy group thereof containing one to four carbon atoms, in an aqueous dispersion or in an organic solvent.

The acyl groups mentioned may, for example, be the acetyl, propionyl and benzoyl groups.

Dyestuffs of the formula (2)

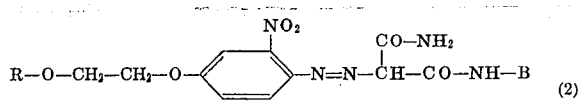
(2)

in which R stands for a hydrogen atom, an alkyl group having one to four carbon atoms, or the acetyl, propionyl or benzoyl group and B is defined as above, are preferably used.

The dyestuffs may also be used in mixture with each other or with other dyestuffs.

On principle, the novel dyestuffs used according to the process of the invention are prepared in known manner by diazotizing a diazo component of the formula (3), preferably of the formula (4)

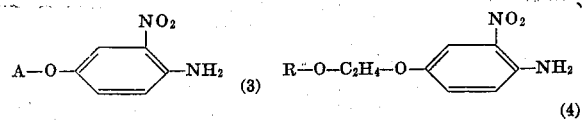

for example in a solution or suspension of a mineral acid with nitrite and coupling with a coupling component of the formula (5)

$$H_2N-OC-CH_2-CO-NH-B$$
(5)

for example in a weakly alkaline, neutral or acid solution or suspension.

Dyestuffs of the formula (2), in which R stands for an acyl group, may be obtained by acylating dyestuffs of the formula (2), in which R stands for a hydrogen atom, in known manner with a corresponding acid or a suitable acid derivative, such as an acid chloride or anhydride.

The coupling components of the formula (5) may be prepared, for example, by particular hydrolysis of cyano-aceto-anilides of the formula (6)

$$NC-CH_2-CO-NH-B$$
(6)

by means of concentrated sulfuric acid at room temperature.

In the above formulae (3), (4), (5) and (6), A, B and R are defined as above.

As synthetic fiber materials, there are mentioned, for example, fibers made from cellulose esters, polyesters, polyolefins, polyamides, polyurethanes and polyacrylonitriles, preferably cellulose esters, such as cellulose acetate and cellulose triacetate; especially fibers made from polyesters, such as polyethylene terephthalate. The synthetic fiber materials may also be blended with each other or with natural fibrous materials, such as cellulose fibers or wool. These materials may furthermore be dyed or printed in various processing forms, for example as combed material, flakes, filaments, knit or woven fabrics.

The dyestuffs used according to the invention are applied, on principle in known manner, generally from an aqueous dispersion but also from an organic solvent. The dyestuffs may be dispersed, for example, by grinding them in the presence of a dispersing agent, such as a condensation product of formaldehyde and a naphthalene-sulfonic acid.

Otherwise, the dyeing conditions depend, to a large extent, on the type of synthetic fiber materials and their processing form.

For example, shaped articles made of cellulose acetate are dyed at a temperature ranging from 74° to 85°C, whereas cellulose triacetate fibers are dyed at a temperature of from about 90° to 125°C.

As to a polyamide fiber material, the dyestuffs are applied at a temperature of from about 90° to 120°C. Polyester fiber materials are dyed according to known methods in the presence of carriers, such as ortho or para-phenyl-phenol, methyl-naphthalene or methyl-salicylate, at a temperature of about 100° to about 130°C, or in the absence of carriers at higher temperatures, for example between 120° and 140°C. Moreover, according to the present process, the dyestuffs may also be applied to the said fibrous materials by pad-dyeing with or without a thickening agent, for example a tragacanth thickener, and fixed under the action of heat, for example by means of vapor or dry heat over about half a minute to 30 minutes at a temperature of from about 100° to 230°C. In order to improve the fastness to rubbing, the material thus dyed as then freed from dyestuff adhering to its surface, for example, by washing or subjecting it to a reductive after-treatment. This reductive after-treatment is generally performed at 60° to 120°C in a liquor containing an aqueous sodium hydroxide solution, sodium dithionite and a non ionic detergent, for example an addition product of ethylene oxide and phenol.

For the dyeing of synthetic fiber materials from organic solvents, the dyestuff may, for example, be allowed to be absorbed by the fiber from the solution at room temperature or at an elevated temperature, preferably at about 70° to about 130°C, where required under pressure, or a knit or woven fabric may be impregnated in a continuous operation with a dyestuff solution, dried and exposed to heat for a short time, for example at a temperature of from about 180° to about 210°C.

As solvents to be used for the exhaustion method, there may, for example, be mentioned solvents which are not miscible with water and have boiling points of about 40° to about 170°C, such as aliphatic halogenated hydrocarbons, for example methylene chloride, trichloro-ethane, trichloro-ethylene, perchloroethylene or trifluoro-trichloro-ethane. For a continuous dyeing operation, there may especially be used water-miscible solvents, for example alcohols or dimethylformamide. The solvents may, of course, also be used in mixtures with each other and may contain further adjuvents which are soluble in solvents, for example oxyalkylation products of fatty alchols, alkylphenols and fatty acids.

For the production of prints on synthetic fiber materials, for example those made from polyesters, polyamides or cellulose triacetate, the dyestuffs to be used according to the invention may be applied in the form of aqueous compositions which may contain suitable thickeners and fixation-promoting agents in addition to the finely divided dyestuffs. Fixation is performed, for example after printing and drying, by means of steaming under atmospheric pressure or under elevated pressure of up to 2.5 atmospheres gage over 10 to 60 minutes. Fixation may also be brought about by the action of hot air of about 160° to about 210°C for a period of 30 seconds to 10 minutes.

The novel dyestuffs to be used according to the invention afford yellow dyeings and prints having excellent fastness properties. Especially striking are the good fastness to light and the extraordinary fastness to thermofixation.

Dyestuffs having a structure very much comparable to that of the dyestuffs of the invention are disclosed in U.S. Pat. No. 3,252,968 and can be used as pigments, for example for the pigment printing. However, these known dyestuffs have practically no absorptive power on synthetic fiber materials and are therefore completely useless for the dyeing and printing of said materials. Hence, it is very surprising that the dyestuffs to be used according to the invention have a very good absorptive power on synthetic fiber materials and yield intense dyeings and prints having very good fastness properties.

The following examples illustrate the invention, the parts and percentages being by weight unless stated otherwise. The parts by volume are to the parts by weight as liter to kilogram under normal conditions.

EXAMPLE 1

10 Parts of polyester yarn were introduced into a dyebath heated to 60°C and containing 300 parts of softened water, 0.3 parts of a finely divided dyestuff of the formula (7)

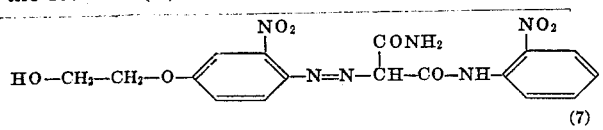

(7)

one part of a commercial carrier, for example o-phenyl-phenol, and 0.5 parts of ammonium sulfate.

The pH-value of the dyebath was adjusted to 5 to 5.5 by means of acetic acid. Within 30 to 60 minutes, the temperature was raied to boiling temperature and the dyeing operation was carried out for 90 minutes at this temperature. The fabric was then taken out, rinsed and subjected to a reductive after treatment for 20 minutes at 80° to 90°C in a bath containing, per liter, six parts of sodium hydroxide solution (38°Be), four parts of sodium dithionite and one part of a non ionic detergent. The dyed fabric was finally rinsed and dried.

A yellow dyeing having very good fastness properties was obtained, especially a good fastness to light and thermofixation as well as a high color yield. A material made of cellulose acetate was dyed in the same manner, the pH of the dyebath being advantageously adjusted to 6 to 6.5. A reductive after-treatment was, however, not necessary.

The dyestuff of the formula (7) could be obtained as follows:

39.6 parts of 3-nitro-4-amino-$\beta$-hydroxy-ethoxy-benezene were dissolved while hot in 400 parts of water and 120 parts of 5N hydrochloric acid and, after having been poured on 2,000 parts of ice water, the solution was diazotized with 40 parts by volume of a 5N sodium nitrite solution. 45.5 parts of the coupling component malonic acid-amide-2'-nitro-anilide were dissolved at room temperature in 800 parts of water and 54 parts by volume of a 33 percent aqueous sodium hydroxide solution and, after two parts of a non ionic emulsifier, such as a reaction product of oleyl alcohol and 30 mols of ethylene oxide had been added, the solution was precipitated while stirring in a finely divided form by quickly adding 40 parts by volume of glacial acetic acid. The diazonium salt solution was then added and the pH-value was adjusted to about 6.5 by means of 2N sodium hydroxide solution.

The precipitated dyestuff was isolated by filtration and washing. It could be dried or brought into a finely divided dispersion in the form of the aqueous filter residue using a commercial dispersing agent, for example a condensation product of formaldehyde and a naphthalene-sulfonic acid.

EXAMPLE 2

10 parts of a polyester fabric were introduced into a dyebath heated to 50°C and containing 400 parts of softened water and 0.2 part of the dyestuff of the formula (8)

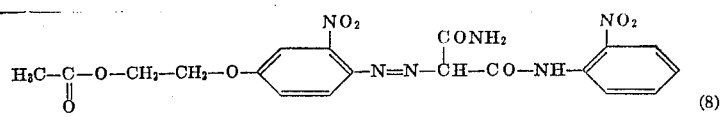

(8)

in a finely divided form.

The pH-value of the dyebath was adjusted to 5 to 5.5 by means of ammonium sulfate and acetic acid. Within 40 to 60 minutes, the temperature was raised to 130°C. At this temperature, dyeing was carried out for 1 hour. The dyed material was then subjected to the after-treatment disclosed in Example 1 and finished.

A yellow dyeing having excellent fastness properties and a high color yield was obtained.

Similar results were obtained using a fabric made of cellulose triacetate fibers instead of polyester fabric and carrying out the dyeing operation at a temperature of 110°C.

Dyeings having the same good fastness properties were also obtained by dyeing a polyester yarn for 30 minutes at 120°C in a closed apparatus with the dyestuff of the formula (8) from perchloro-ethylene.

The dyestuff of the formula (8) was obtained by acylating the dry dyestuff of the formula (7), which could be prepared as in Example 1, with acetic acid anhydride, for example in a benzene solution while heating.

EXAMPLE 3

A blended fabric of polyester and cellulose fibers was impregnated at 25° to 30°C with a dyeing liquor, the pH of which was adjusted to 5 to 5.5 by means of acetic acid and which contained 10 g per liter of the finely divided dyestuff of the formula (9)

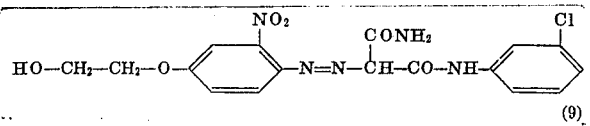

(9)

The fabric was then dried at a temperature of from 100° to 110°C. Fixation was brought about by dry heat for 30 to 90 seconds at 190° to 230°C. Finally, a reductive after-treatment as disclosed in Example 1 was made and the fabric was finished.

A yellow dyeing having excellent fastness properties, especially a very good fastness to subliming, was obtained. Similar high-quality dyeings were obtained by dyeing cellulose triacetate fiber materials in the same manner.

The dyestuff of the formula (9) was obtained using 43.5 parts of malonic acid-amide-3'-chloro-anilide as the coupling component and otherwise following the treatment disclosed in Example 1.

EXAMPLE 4

A polyester fabric was printed with a printing paste containing, per 1,000 parts, in addition to a commercial thickener, such as alginate and starch ether as well as further usual additives, 200 parts of an aqueous dyestuff composition containing 10 percent of the finely divided dyestuff of the formula (10)

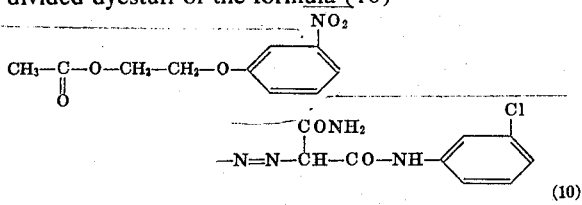

(10)

and then dried.

The dyestuff was then fixed by means of hot air for 60 seconds at 200°C.

The print was rinsed, subjected to a reductive after-treatment in a bath containing sodium dithionite and sodium hydroxide solution, then cleaned again in another bath containing a non ionic detergent, for example the condensation product of nonylphenol and 10 mols of ethylene oxide, rinsed once more and dried.

A yellow print having a high color intensity an excellent fastness properties, especially an outstanding fastness to thermofixation, was obtained. Similar good results were obtained by carrying out the fixation for 20 minutes by means of pressurized steam of 2 atmospheres gage.

When, instead of a polyester fabric, a fabric made of cellulose triacetate fibers was used, for which no reductive after-treatment was necessary, color-intense prints having very good fastness properties were also obtained.

The dyestuff of the formula (10) was obtained by acylating the dry dyestuff of the formula (9), which could be prepared as in Example 3, with acetic acid anhydride.

EXAMPLE 5

A fabric made of polyester fibers was printed with a printing paste according to Example 4, containing, however, a dyestuff of the formula (11)

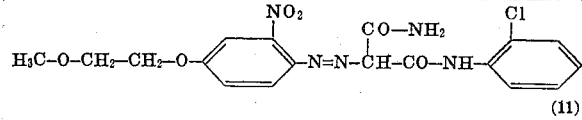

(11)

and then dried.

The fixation was carried out by steaming under atmospheric pressure for 30 minutes.

After the cleaning and drying operation, a reddish yellow print having a high color intensity and good fastness properties was obtained.

Valuable prints were also obtained using, instead of a fabric made of polyester fibers, a fabric made of cellulose acetate fibers.

The dyestuff of the formula (11) was obtained using, as the diazo component, 42.4 parts of 3-nitro-4-amino-β-methoxy-ethoxy-benzene and, as the coupling component, 43.5 parts of malonic acid-amide-2'-chloro-anilide and otherwise following the treatment disclosed in Example 1.

The following Table comprises further dyestuffs of the formula (1) to be used according to the invention.

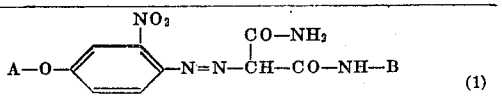

(1)

TABLE

| Ex. No. | A | B | Shade on polyester fibers |
|---|---|---|---|
| 6 | HOC$_2$H$_4$— | Phenyl | Yellow. |
| 7 | HOC$_2$H$_4$— | 3-trifluoromethyl-phenyl | Do. |
| 8 | HOC$_2$H$_4$— | 2-chloro-4-nitro-phenyl | Do. |
| 9 | HOC$_2$H$_4$— | 2-chloro-phenyl | Do. |
| 10 | HOC$_2$H$_4$— | 3-bromo-phenyl | Do. |
| 11 | HOC$_2$H$_4$— | 4-fluoro-phenyl | Do. |
| 12 | CH$_3$COOC$_2$H$_4$— | 2-chloro-phenyl | Do. |
| 13 | CH$_3$COOC$_2$H$_4$— | 3-cyano-phenyl | Do. |
| 14 | CH$_3$COOC$_2$H$_4$— | 4-i-propyl-phenyl | Do. |
| 15 | CH$_3$COOC$_2$H$_4$— | 2-methyl-phenyl | Do. |
| 16 | CH$_3$COOC$_2$H$_4$— | 4-ethoxy-phenyl | Do. |
| 17 | CH$_3$COOC$_2$H$_4$— | α-Naphthyl | Do. |
| 18 | CH$_3$COOC$_2$H$_4$— | 4-biphenyl | Do. |
| 19 | CH$_3$OC$_2$H$_4$— | 2-methoxyphenyl- | Reddish yellow. |
| 20 | CH$_3$OC$_2$H$_4$— | 3-chloro-phenyl | Yellow. |
| 21 | CH$_3$OC$_2$H$_4$— | 4-t-butyl-phenyl | Do. |
| 22 | CH$_3$OC$_2$H$_4$— | 3-acetyl-phenyl | Do. |
| 23 | CH$_3$OC$_2$H$_4$— | 4-benzoyl-phenyl | Do. |
| 24 | C$_3$H$_7$OC$_2$H$_4$— | 4-fluoro-phenyl | Do. |
| 25 | C$_3$H$_7$OC$_2$H$_4$— | 4-carbethoxy-phenyl | Do. |
| 26 | HO—CH—CH$_2$— <br>         CH$_2$—O—C$_6$H$_5$ | Phenyl | Do. |
| 27 | C$_2$H$_5$OC$_2$H$_4$— | 2-ethyl-phenyl | Do. |
| 28 | C$_2$H$_5$COOC$_2$H$_4$— | 3-chloro-phenyl | Do. |
| 29 | C$_2$H$_5$COOC$_2$H$_4$— | 2-carbobutoxy-phenyl | Do. |
| 30 | C$_6$H$_5$COOC$_2$H$_4$— | 3-cyano-phenyl | Greenish yellow. |
| 31 | C$_6$H$_5$COOC$_2$H$_4$— | 2-trifluoromethyl-phenyl | Do. |
| 32 | HOC$_2$H$_4$— | 4-methyl-phenyl | Yellow. |
| 33 | HOC$_2$H$_4$— | 4-butoxy-phenyl | Reddish yellow. |
| 34 | HOCH$_2$— | 3-acetyl-phenyl | Yellow. |
| 35 | HOCH$_2$CH(OH)CH$_2$ | 4-fluoro-phenyl | Do. |
| 36 | CH$_3$— | 2-methyl-phenyl | Do. |
| 37 | CH$_3$— | 3-chloro-phenyl | Do. |
| 38 | C$_3$H$_7$— | 2-bromo-phenyl | Do. |
| 39 | C$_4$H$_9$— | 4-t-butyl-phenyl | Do. |
| 40 | CH$_3$— | 3-methoxy-phenyl | Reddish yellow. |
| 41 | C$_2$H$_5$— | 2-carbomethoxy-phenyl | Yellow. |
| 42 | C$_4$H$_9$— | 2-nitro-phenyl | Do. |
| 43 | C$_4$H$_9$— | 2,4,5-trichloro-phenyl | Do. |
| 44 | C$_2$H$_5$— | 2,5-dimethyl-phenyl | Do. |
| 45 | C$_2$H$_5$COOC$_2$H$_4$— | 3-nitro-phenyl | Do. |
| 46 | C$_2$H$_5$COOC$_2$H$_4$— | 4-trifluoromethyl-2-nitro-phenyl. | Do. |
| 47 | CH$_3$OC$_2$H$_4$— | 2-nitro-phenyl | Do. |
| 48 | CH$_3$OC$_2$H$_4$— | α-Naphthyl | Do. |

We claim:
1. A process for the preparation of fast dyeings or prints on synthetic fibrous materials, which comprises treating the said fibrous materials in a dye bath selected from the group consisting of an aqueous dispersion, an organic solvent and mixtures thereof with a dyestuff of the formula

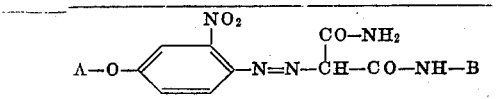

in which A represents alkyl of one to four carbon atoms being unsubstituted or substituted by hydroxyl, lower alkoxy, phenoxy,

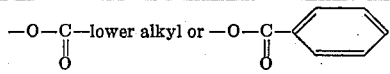

or combinations of two members thereof and B represents phenyl being unsubstituted or substituted by fluorine, chlorine, bromine, alkyl of one to four carbon atoms, alkoxy of one to four carbon atoms, trifluoromethyl, cyano, nitro, carbo(lower)-alkoxy, acetyl, benzoyl or phenyl or combinations of two or three members thereof, or naphthyl.

2. A process as claimed in claim 1, wherein the synthetic fibrous material is selected from the group consisting of cellulose acetate, cellulose triacetate, polyamides, polyurethanes, polyolefines, polyacrylonitriles and polyesters.

3. A process as claimed in claim 1, wherein the said fibrous materials are dyed with an aqueous dispersion of the said dyestuffs at a temperature between about 75° and about 140°C in the absence or in the presence of a carrier.

4. A process as claimed in claim 1, wherein the said fibrous materials are dyed with the said dyestuffs from organic solvents between room temperature and about 130°C.

5. A process as claimed in claim 1, wherein the said fibrous materials are padded with an aqueous dispersion of the said dyestuffs and the dyestuffs are subsequently fixed at elevated temperature.

6. A process as claimed in claim 5, wherein the aqueous dispersion of the dyestuffs contains a thickening agent.

7. A process as claimed in claim 5, wherein the dyestuffs are fixed by steaming or heating them with dry heat at a temperature between about 100° and about 230°C.

8. A process as claimed in claim 1, wherein the fibrous materials are impregnated with the said dyestuffs from an organic solvent and dried, and the dyestuffs are subsequently fixed by a short-time action of heat.

9. A process as claimed in claim 1, wherein the dyestuffs are fixed by a shoft-time action of heat at a temperature of from about 180°C to about 210°C.

10. A process as claimed in claim 1, wherein the said fibrous materials are printed with water-containing preparations of the said dyestuffs and the dyestuffs are subsequently fixed by drying the prints and steaming them under atmospheric pressure or elevated pressure of up to 2.5 atmospheres gage or by a short-time action of hot air of about 180° to about 210°C.

11. A process as claimed in claim 10, wherein the water-containing preparations of the dyestuffs contain a member selected from the group consisting of a thickening agent, a fixing accelerator and a combination thereof.

* * * * *